Oct. 28, 1924.
R. H. GRIFFITH
1,513,501
CULTIVATOR
Filed April 20, 1922    4 Sheets-Sheet 2
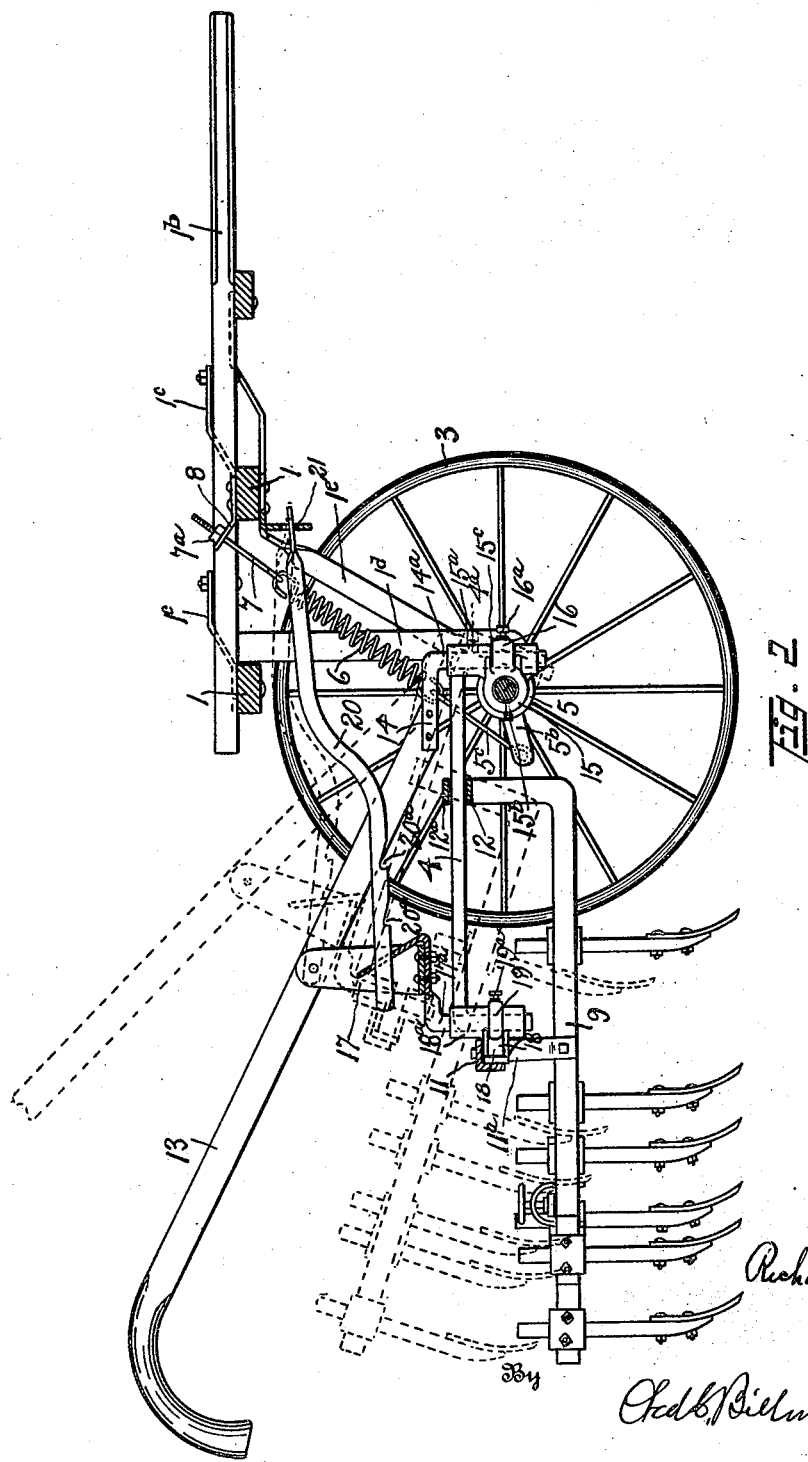

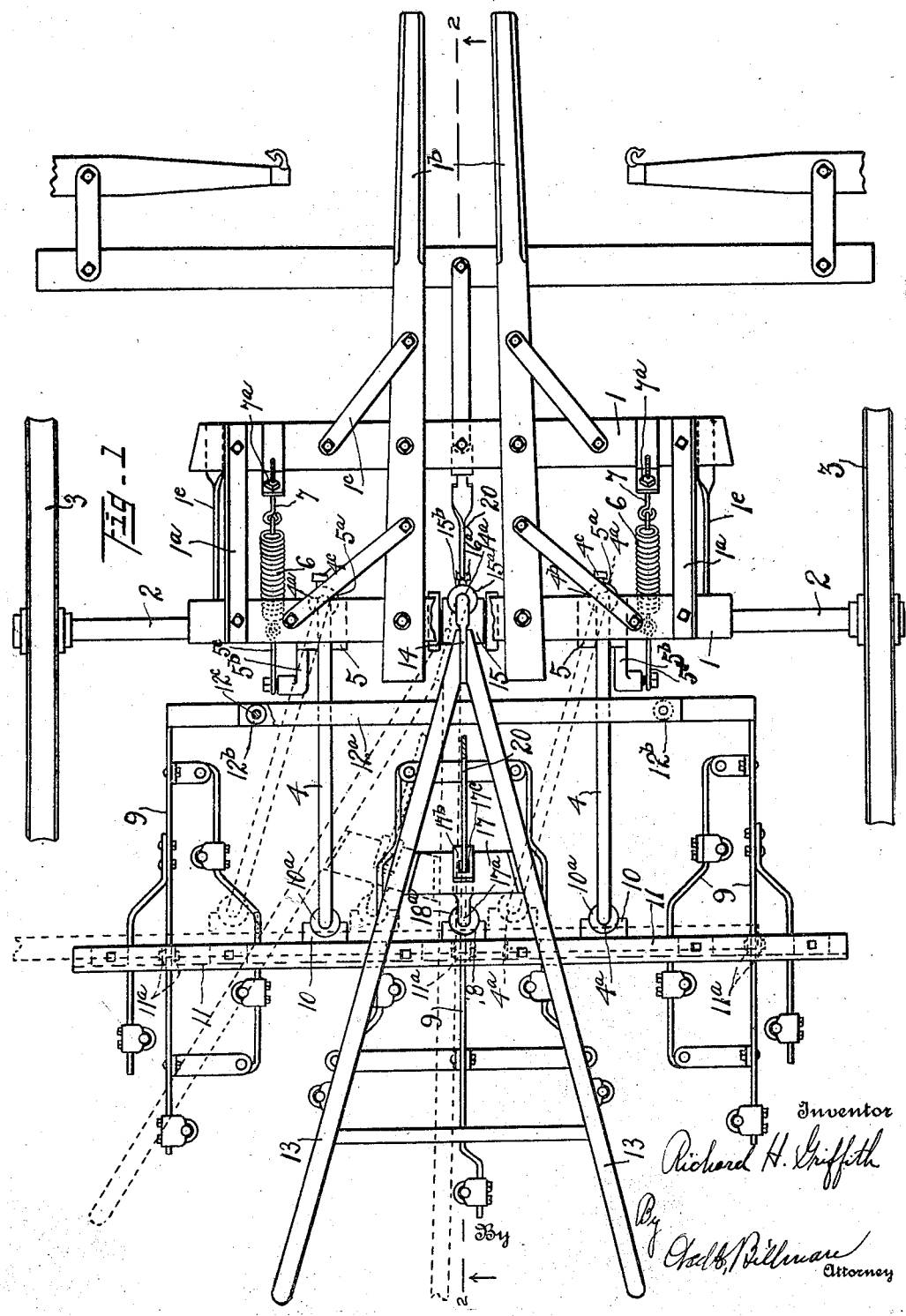

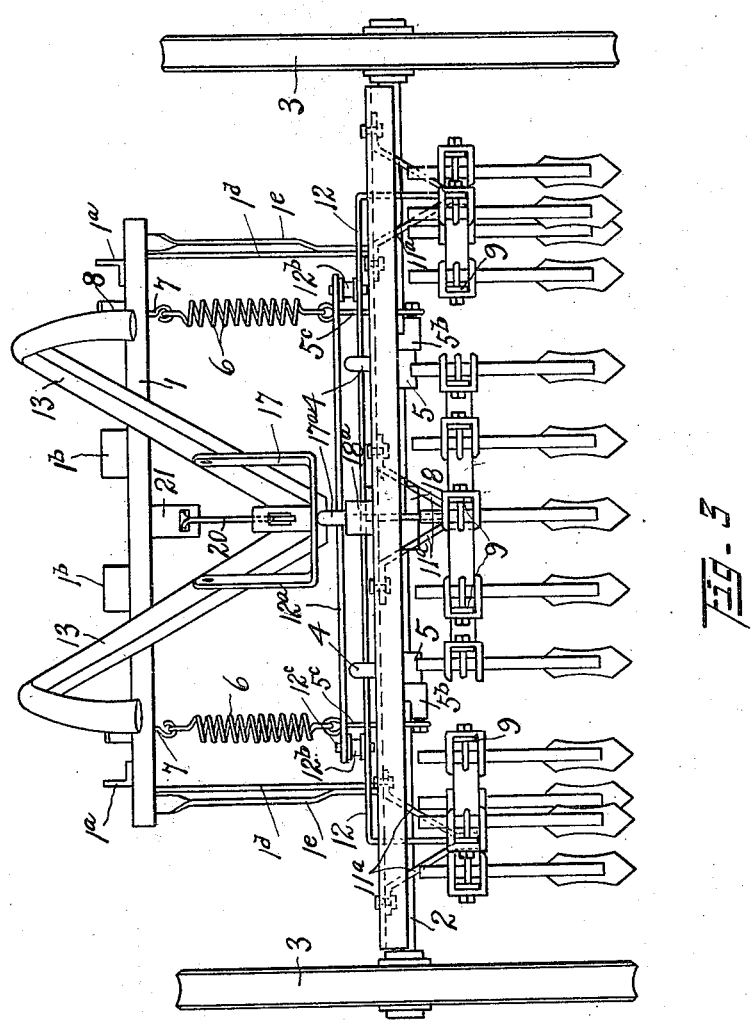

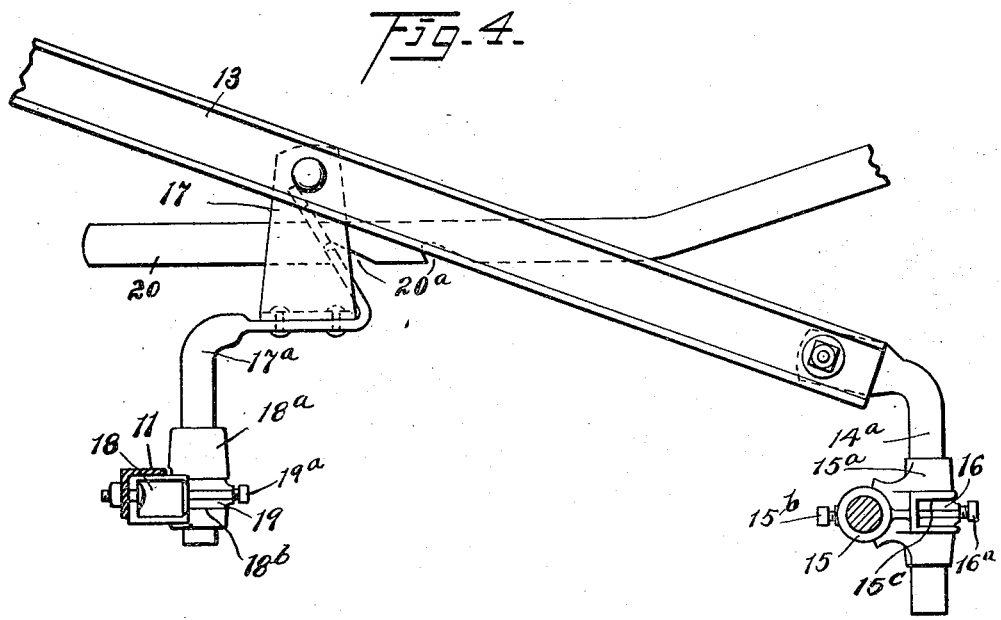
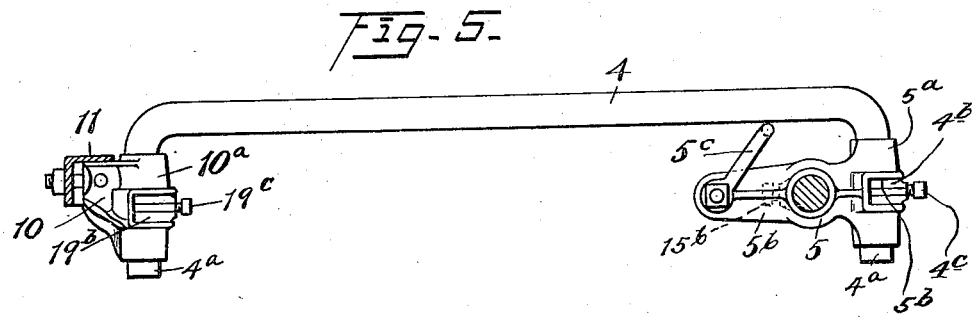

Patented Oct. 28, 1924.

1,513,501

UNITED STATES PATENT OFFICE.

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

CULTIVATOR.

Application filed April 20, 1922. Serial No. 555,789.

*To all whom it may concern:*

Be it known that I, RICHARD H. GRIFFITH, a citizen of the United States, residing at Bellevue, in the county of Sandusky and State of Ohio, have invented certain new and useful Improvements in Cultivators, of which the following is a specification.

My invention relates to improvements in cultivators, and more particularly to that class or type known as "two-row" cultivators.

The present embodiment of the invention further relates to a two-row cultivator of the wheeled walking type being provided with central and side cultivator gangs spaced a predetermined distance apart to receive the rows of growing crops, the gangs being held in relative fixed parallel relation to each other at all times and being adapted to be swung to one side or the other or elevated simultaneously by the operator through the medium of the centrally located gang operating or steering mechanism by the operator walking between the rows being cultivated.

The present embodiment of the invention is particularly designed and adapted for use as a two-row sugar beet cultivator and with this end in view, the cultivator gangs are counter-balanced through the medium of suitable tension springs suitably and adjustably mounted and arranged on the cultivator frame and connected to parallel extending draft bars flexibly connected to a common transversely extending bar (in the present instance the axle shaft) whereby the same may be swung simultaneously to one side or the other or elevated as desired in imparting a similar movement to the relatively fixed parallel extending cultivator gangs through the medium of the gang controlling or steering and operating mechanism having a similar connection between such common transversely extending bar and a transverse bar flexibly connected to the parallel extending draft bars and extending over and rigidly connected to the cultivator gangs.

A still further object is the provision of automatically operating hanger mechanism adapted to automatically engage and support the gangs when the latter are raised to an elevated or transporting position through the medium of the common or unitary gang actuating or steering mechanism.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a top plan view of a cultivator constructed in accordance with this invention, the dotted lines illustrating the relative arrangement and action of the parts when the cultivator gangs are simultaneously swung to one side through the cultivator steering or controlling mechanism.

Fig. 2 is a central longitudinal sectional view taken on line 2—2 of Fig. 1, the dotted lines showing the position of the parts when the gangs are elevated and automatically held in a transporting position.

Fig. 3 is a rear elevation of the same.

Fig. 4 is an enlarged fragmentary side elevation of the central steering handle and hanger bar and illustrating in particular the swivelling connections between the steering handle and the transverse axle shaft and the subjacent laterally movable gang connecting and spacing bar.

Fig. 5, an enlarged side elevation of one of the parallel draft bars or links, and illustrating in particular the swivelling connections between the latter and the axle shaft and laterally movable gang connecting and spacing bar.

Similar numerals of reference designate like parts throughout all the figures of the drawings.

The improved cultivator comprises a suitable cultivator frame consisting, in the present instance, of a pair of transverse bars 1, connected by longitudinally extending angle bars 1ª, and, in the present instance, by means of a pair of longitudinally extending tongue or pole bars 1ᵇ, which latter, in the present instance, are braced by means of the brace members 1ᶜ. The cultivator frame also includes vertically extending side bars or arch members 1ᵈ, braced by means of the forwardly inclined brace members 1ᵉ, the parts 1ᵈ and 1ᵉ being suitably connected to a transverse bar 2 which, in the present instance, is in the specific form of an axle shaft provided at its ends with the cultivator ground or carrying wheels 3.

As a means of swinging the cultivator gangs simultaneously to one side or the other in parallel relation at all times or simultaneously moving the same to and from their respective working and transporting positions through the medium of a centrally located gang operating or steering mechanism as hereinafter referred to, a pair of rearwardly extending parallel arranged draft bars 4, are provided, said bars being provided at their ends with depending bearing ends 4$^a$, forming pivots, the front bearing ends 4$^a$ extending into vertically extending bearing heads or sockets 5$^a$, formed as a part of bearing sleeves 5, mounted on the axle 2, and provided with rearwardly extending arms 5$^b$, the latter being provided with links 5$^c$, connected to upwardly and forwardly extending tension springs 6, the upper ends of said springs 6 being connected to bolts 7, extending through brackets 8, connected to the front bar 1, said bolts being adapted to be adjusted for adjusting the tension of the springs 6 by means of adjusting nuts 7$^a$.

The front depending ends 4$^a$ of the draft bars 4 are held in position so as to permit lateral or swivelling movement in the bearing heads 5$^a$ of the sleeves by means of collars 4$^b$, mounted in recesses 5$^d$, of the heads and intersecting the openings of the bearing heads, said collars 4$^b$ receiving the bearing ends of the draft bars and being adapted to be secured to the latter by means of set screws 4$^c$.

As a means of rigidly connecting and spacing the cultivator gangs made up of the beams or drag bars 9, in parallel relation to each other and flexibly connecting said parallel extending draft bars to a common draft bar, the rear depending bearing ends 4$^a$ of the draft bars extend through bearing heads or sockets 10$^a$, of bearing brackets 10, the latter being connected to a transversely extending gang connecting and spacing bar 11, rigidly connected to the cultivator gangs or beams 9, so that the latter may be simultaneously actuated by the cultivator steering or operating mechanism hereinafter referred to. The transverse bar 11 forms in effect a floating bar extending, in the present instance, above the gangs and connected by means of suitable depending bracket members 11$^a$. The rear depending ends 4$^a$ of the bars or links 4 extend into sleeve heads 10, and are swivelly secured therein by means of collars 19$^b$, mounted in recesses similar to the collars 4$^b$ and recesses 5$^d$ at the front, said collars 19$^b$ being secured to the depending ends 4$^a$ by means of set screws 19$^c$, as shown most clearly in Fig. 5 of the drawings.

The front ends of the cultivator gangs are connected to a front transverse bar made up, in the present instance, of a lower member 12, rigidly connected to the front ends of the central and side cultivator gangs and a second or upper member 12$^a$, secured by means of spacing spools 12$^b$, (see Fig. 3) and secured by means of suitable fastening elements or bolts 12$^c$.

It will be seen that the rearwardly extending draft bars 4 are slidably connected with the front transverse gang spacing bar made up of the members 12 and 12$^a$ and, in the present instance, extend between such members so that the intersecting portions of the draft bars 4 may be freely moved laterally and relatively of such transverse members 12 and 12$^a$, as shown most clearly in dotted lines in Fig. 1 of the drawings.

As a means of simultaneously actuating or steering the cultivator gangs with respect to the rows being cultivated and also elevating or vertically moving the cultivator gangs to and from their elevated or transporting positions, the improved cultivator is provided, in the present instance, with a pair of forwardly converging handle beams 13, connected together at their front ends by means of a connecting bracket 14, the latter having a depending end 14$^a$, extending downwardly into a bearing sleeve or socket 15$^a$, of a sleeve 15, on the axle 2 (see Fig. 4) and secured on said axle by means of a set screw 15$^b$. The end 14$^a$ of the bracket is secured in the socket 15$^a$ by means of a collar 16, mounted in a recess 15$^c$, and secured by means of a set screw 16$^a$, the parts 15$^a$ and 15 and 16 and 15$^c$ being similar to the parts 5$^a$ and 5 and 5$^b$ and 4$^b$, hereinbefore referred to.

As a means of flexibly connecting the handle beams 13 to the rear transverse or draft bar 11, said beams 13 are provided on their inner sides with a depending bracket or stirrup 17, the latter terminating at its rear end in a depending bearing arm or rod 17$^a$, extending into a vertically extending bearing head or socket 18$^a$, forming a part of a bracket 18, secured on the front central portion of the transverse draft bar 11.

The depending bearing member 17$^a$, is secured in the socket or head 18$^a$ by means of a collar 19, mounted in a recess 18$^b$, and the front portion of the bearing head 18$^a$ and said collar 19 being secured to the bracket rod 17$^a$ by means of a set screw 19$^a$, and it will be obvious by reason of this construction that when the gangs are moved to one side or the other through the medium of the handle beams 13 this arrangement will permit the collar 19 to swivel in the recess 18$^b$.

As a means of automatically engaging and holding the handle bars 13 together with the subjacent attached gangs when the latter are elevated to a predetermined transporting position, as shown by dotted lines in Fig. 2 of the drawings, the bracket or stirrup 17 is provided with an upwardly and rearwardly extending bracket or extension 17ᵇ, provided with a slot opening 17ᶜ, the latter being adapted to slidably receive and contain a hanger bar 20, the latter extending forwardly and being pivotally connected in the depending bracket 21, arranged beneath the front transverse bar 1 of the cultivator frame.

The lower edge of the rear portion of the bar 20 is provided with suitably spaced notches 20ᵃ, which through the action of gravity when the gangs and handle beams 13 are elevated, will drop into engagement with the lower portion of the slot 17ᶜ and thus automatically engage and hold the parts in an elevated position and when it is desired to drop the handles and gangs to their down or earth working position it is obvious that the operator may readily take hold of the rear end of the hanger bar, and raise the same to unlocked position whereupon the parts may be lowered.

Having thus described one of the embodiments of my invention, without having attempted to set forth all the forms in which it may be made, or all the modes of its use, what I claim and desire to secure by Letters Patent is,—

1. In a cultivator, the combination with a wheeled draft frame, and parallel bars connected to said frame on horizontal and vertical axes, of a gang frame composed of transverse bars and longitudinal gang bars carrying shovels, said parallel bars being pivoted to said frame on vertical axes, handles for raising and lowering the gang frame and for shifting said frame laterally, said handles being connected with the draft frame on vertical and horizontal axes, and a bracket connected between the handle and the rear of the gang frame.

2. In a cultivator, the combination with a wheeled draft frame, and parallel bars connected to said frame on horizontal and vertical axes, of a gang frame composed of transverse bars and longitudinal gang bars carrying shovels, said parallel bars being pivoted to said frame on vertical axes, handles for raising and lowering the gang frame and for shifting said frame laterally, said handles being connected with the draft frame on vertical and horizontal axes, a bracket connection between the handle and the rear of the gang frame, and a hanger bar adapted to engage the said bracket to sustain the handles and gang frame in an elevated position.

3. In a cultivator, the combination with a wheeled draft frame, and parallel bars connected thereto on vertical and horizontal axes, of a gang frame comprising two transverse bars, longitudinal gang bars rigidly secured thereto and each carrying cultivating shovels, a pair of handles converged at their forward ends and connected to the axle on horizontal and vertical axes, said parallel bars being connected to the gang frame on vertical axes, a bracket secured to the handles and having an extension connected with the gang frame on a vertical axis, and a hanger bar carried by the wheeled frame and having notches adapted to engage with the part of said bracket for the purpose of holding the gang frame in elevated position.

In testimony whereof I have affixed my signature.

RICHARD H. GRIFFITH.